June 2, 1931.                E. CHESHIRE                1,807,895
ATTACHMENT FOR CUTTING MACHINES
Filed Feb. 9, 1927
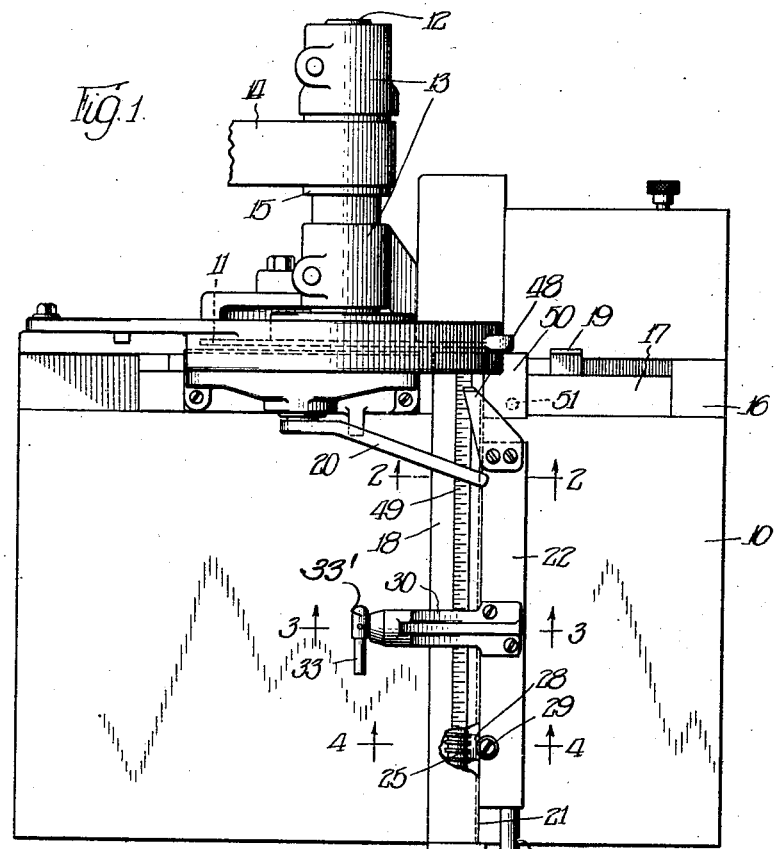
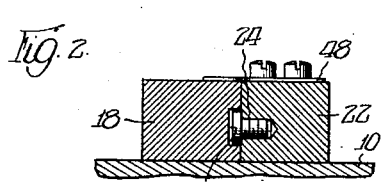
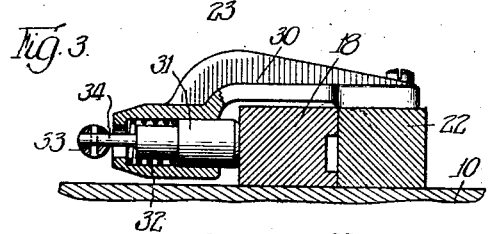
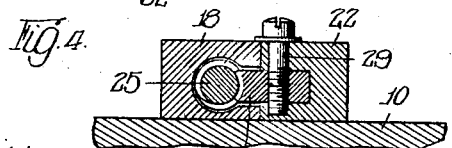
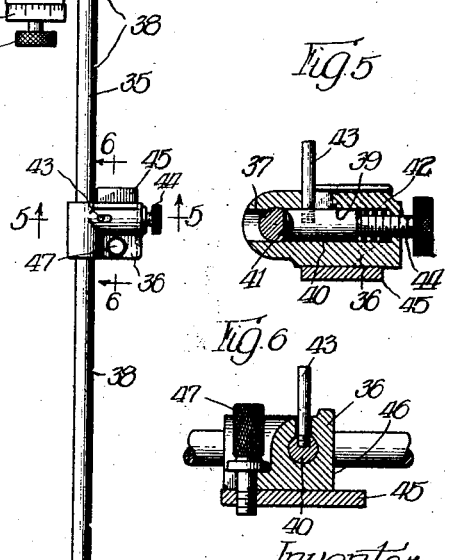
Inventor:
Edward Cheshire, Patented June 2, 1931

1,807,895

UNITED STATES PATENT OFFICE

EDWARD CHESHIRE, OF ST. PETERSBURG, FLORIDA

ATTACHMENT FOR CUTTING MACHINES

Application filed February 9, 1927. Serial No. 166,869.

The present invention relates to attachments for cutting machines.

The invention will be described with reference to structure such as is disclosed in my Patent No. 1,463,545, of July 31, 1923, though, as will appear as the description proceeds, the invention is not limited thereto, but is of broader application.

An object of the present invention is to provide a structure in which long pieces of material may be efficiently supported and accurately gauged.

A further object is to provide an attachment for supporting and gauging relatively long pieces of material which attachment is simple to operate and sturdy in construction.

Further objects will appear as the description proceeds.

Referring to the drawings—

Figure 1 is a top plan view of a cutting machine such as illustrated in Patent No. 1,463,545, above referred to, which cutting machine has applied thereto an attachment embodying the principles of the present invention;

Figure 2 is a sectional view taken along the plane indicated by the arrows 2—2 of Figure 1;

Figure 3 is a sectional view taken along the plane indicated by the arrows 3—3 of Figure 1;

Figure 4 is a sectional view taken along the plane indicated by the arrows 4—4 of Figure 1;

Figure 5 is a sectional view taken along the plane indicated by the arrows 5—5 of Figure 1; and Figure 6 is a sectional view taken along the plane indicated by the arrows 6—6 of Figure 1.

Referring first to Figure 1, the numeral 10 indicates a table top which has cooperatively associated therewith the circular saw 11, which saw is adapted to be driven by the shaft 12 mounted in the bearings 13—13. The particular machine illustrated is driven by means of a belt 14, which drives a pulley 15 secured to said shaft 12. The table 10 is provided with the slot or groove 16 in which is slidably mounted the bar 17, which bar 17 has secured thereto in right angular relationship therewith the upstanding jaw or gauge 18. Cooperating with the jaw or gauge 18 is the jaw 19, which is controlled by a handle 20 through certain operating mechanism (not shown). A swinging movement of the handle 20 about an axis parallel with the gauge member 18 results in a tightening of the jaw member 19 against the member to be operated upon, and a reverse movement of said handle 20 results in loosening said jaw 19. No novelty is claimed herein for the means for clamping the work between the jaw member 18 and the jaw 19, and the operating mechanism responsive to movement of the handle 20 need not be described herein, mechanism suitable for the purpose being disclosed in said Patent No. 1,463,545. As described in said Patent No. 1,463,545, a member may be associated with the gauge 18 for positioning the extremities of members to be operated upon by the saw 11 when said members are clamped by the jaw 19. According to the present invention, means are provided for positioning members of relatively great length.

The gauge member 18 is provided with a bearing surface on its right-hand edge as the parts are viewed in Figure 1, which bearing surface is indicated by the numeral 21. Disposed in sliding relationship with the bearing surface 21 of the gauge member 18 is the bar 22, which has a corresponding bearing surface. Said bearing surface 21 is slotted as indicated by the numeral 23, which slot closely receives the head of the pin or stud 24 projecting from the bearing surface of the bar 22. Extending longitudinally of the gauge member 18 is the screw-threaded shaft 25 adapted to be turned by the finger hold 26. Adjacent to the finger hold 26 is the scale 27, by means of which the setting of the screw-threaded shaft 25 may be observed. Disposed within the bar 22 is the member 28 having teeth adapted to mesh with the screw-threaded shaft 25. Said member 28 is secured in place in a suitable slot in the bar 22 by means of the screw 29. Secured to the upper side of the bar 22 is the bracket 30, which provides a bearing for a plunger 31 spring-pressed inwardly by the spring 32. The inner extremity of the plunger 31 is adapted to bear against the left-hand surface (as the parts are viewed in Figures 1 and 3) of the gauge member 18 with frictional engagement, whereby to hold the bar 22 in engagement with the gauge member 18 while permitting sliding movement of said bar 22 with reference to said gauge member 18 when said shaft 25 is turned. In order to hold the plunger 31 out of bearing engagement with the gauge member 18, when desired, a finger grip 33 is provided, which finger grip is pivotally connected to the finger 34 projecting from the outer extremity of the plunger 31. The finger grip 33 is provided at one end with rounded extensions 33' so that when it is moved to a predetermined position it will hold the plunger 31 against the tension of the spring 32 out of bearing engagement with a gauge member 18. When said finger grip has been moved from its predetermined position the spring 32 will be free to urge the plunger 31 into the bearing engagement referred to.

Projecting rearwardly from the bar 22 is the rod 35, the axis of which is parallel to the bearing surface 21 of the gauge member 18. Mounted upon the rod 35 is the supporting member 36, which member is provided with the aperture 37 for receiving said rod 35. Said rod is provided with a plurality of notches 38—38 spaced apart predetermined distances from the cutting edge of the saw 11 when the screw-threaded shaft 25 is in zero position. The supporting member 36 is provided with the second aperture 39 communicating with the aperture 37. Disposed within said aperture 39 is the plunger 40, the end portion 41 of which is adapted to seat itself within any one of the notches 38 of the rod 35. A spring 42 biases the plunger 40 into engagement with said rod 35. Said plunger 40 is provided with a finger grip 43 by means of which said plunger 40 may be manipulated for permitting the convenient moving of said supporting member 36 from one notch 38 to another notch 38. A screw 44 is provided for holding the plunger 40 in position within one of the notches 38, whereby accidental movement of the supporting member 36 from one notch to another notch is prevented. The supporting member 36 is provided with a shelf 45 for supporting the extremities of members to be operated upon by the saw 11. The forward surface 46 of the supporting member 36 constitutes an abutment for said members to be operated upon. Said shelf 45 may be held in place by means of the screw 47.

The extremity of the bar 22 adjacent to the saw 11 is provided with an indicator 48 adapted to be disposed in proximity to the scale 49 disposed longitudinally of the gauge member 18. The numeral 50 indicates a block having the same width as the bar 22, which block serves as an abutment in proximity to the saw 11 for members to be operated upon. Said block 50 also provides an abutment to limit longitudinal movement of the bar 22, whereby said bar 22 and the indicator 48 carried thereby will not be permitted to be moved into a region to be injured by the saw 11. Said block 50 is provided with a pin 51 fitting into a corresponding hole in the bar 17 for holding said block 50 releasably in position.

It will be understood without detailed explanation that when it is desired to utilize the cutting machine for operating upon elongated members, the supporting member 36 with its shelf 45 may be readily positioned at the desired point on the rod 35, the plunger 40 of said support 36 engaging one of the notches 38. By manipulation of the finger hold 26 the shaft 25 may be turned whereby to communicate longitudinal movement to the rack 28, whereby the bar 22 and consequently the supporting member 36 may be set at the desired position. The spring-pressed plunger 31 carried by the bracket 30 will, in cooperation with the pin or stud 24 and the rack 28, hold the bar 22 in position upon the bearing surface 21 of the gauge member 18. By reason of the fact that the plunger 31 has only a frictional engagement with the gauge member 18, sliding movement may be communicated to the bar 22 by a mere turning of the finger hold 26.

Though a preferred embodiment of the present invention has been described in detail, it will be clear that many modifications will occur to those skilled in the art. It is intended to cover all such modifications that fall within the scope of the appended claims.

What is claimed is—

1. In a device of the character described, the combination of an abutment member adapted to be positioned to project in angular relationship to the plane of the cutter of cutting mechanism, said abutment member having a bearing surface and being provided with a screw-threaded shaft, a removable supporting member having means adapted to engage said shaft whereby rotation of said shaft will communicate longitudinal movement to said supporting member, and yieldable means for holding said supporting member in engagement with said bearing surface, said supporting member comprising an elongated member and an abutment member adjustably carried by said elongated member for supporting the extremities of work to be operated upon by said cutter.

2. In a device of the character described, the combination of an abutment member adapted to be associated with cutting mechanism, a member adapted to have sliding relationship with said abutment, said abutment being provided with a screw-threaded shaft, said member being provided with tooth means for engaging said shaft whereby rotation of said shaft will communicate longitudinal movement to said member, and means for yieldably holding said member in slidable relationship with said abutment, said member being provided with work supporting and positioning means and being provided with spaced means for the convenient location of said work supporting and positioning means relative to the cutter of said cutting mechanism.

3. In a device of the character described, the combination of an abutment member adapted to be associated with cutting mechanism, a member adapted to have sliding relationship with said abutment, said abutment being provided with a screw-threaded shaft, said member being provided with tooth means for engaging said shaft whereby rotation of said shaft will communicate longitudinal movement to said member, and means for yieldably holding said member in slidable relationship with said abutment, said member being provided with work supporting and positioning means and being provided with spaced means for the convenient location of said work supporting and positioning means relative to the cutter of said cutting mechanism, said work supporting and positioning means including a yieldable plunger for cooperation with said spaced means for holding said work supporting and positioning means yieldably in predetermined positions.

4. In a device of the character described, the combination of an abutment member adapted to be associated with cutting mechanism, a member adapted to have sliding relationship with said abutment, said abutment being provided with a screw-threaded shaft, said member being provided with tooth means for engaging said shaft whereby rotation of said shaft will communicate longitudinal movement to said member, and means for yieldably holding said member in slidable relationship with said abutment, said member being provided with work supporting and positioning means and being provided with spaced means for the convenient location of said work supporting and positioning means relative to the cutter of said cutting mechanism, said work supporting and positioning means including a yieldable plunger for cooperation with said spaced means for holding said work supporting and positioning means yieldably in predetermined positions, said work supporting and positioning means being provided with a stop for rigidly holding said plunger in engagement with said member.

5. In a device of the character described, the combination of an abutment member, adapted to be associated with cutting mechanism, a member adapted to have sliding relationship with said abutment, said abutment, being provided with a screw-threaded shaft, said member being provided with tooth means for engaging said shaft whereby rotation of said shaft will communicate longitudinal movement to said member, and means for yieldably holding said member in slidable relationship with said abutment, said member being provided with work supporting and positioning means and being provided with spaced means for the convenient location of said work supporting and positioning means relative to the cutter, of said cutting mechanism, said work supporting and positioning means including stop means for cooperation with said spaced means for rigidly holding said work supporting and positioning means in predetermined positions on said member.

Signed at Milwaukee, Wisconsin, this 5th day of February, 1927.

EDWARD CHESHIRE.